US007765559B2

(12) United States Patent
Chichkov et al.

(10) Patent No.: US 7,765,559 B2
(45) Date of Patent: Jul. 27, 2010

(54) APPARATUS AND METHOD FOR COMMUNICATING BETWEEN CELLULAR MODEM SOFTWARE AND APPLICATION ENGINE SOFTWARE OF A COMMUNICATIONS DEVICE

(75) Inventors: Ivan Chichkov, Vantaa (FI); Dmitry Kolesnikov, Helsinki (FI)

(73) Assignee: Nokia Corporation, Espoo (FI)

( * ) Notice: Subject to any disclaimer, the term of this patent is extended or adjusted under 35 U.S.C. 154(b) by 1739 days.

(21) Appl. No.: 10/774,297

(22) Filed: Feb. 6, 2004

(65) Prior Publication Data

US 2005/0177702 A1     Aug. 11, 2005

(51) Int. Cl.
G06F 3/00 (2006.01)
G06F 9/44 (2006.01)
(52) U.S. Cl. .................. 719/328; 719/313; 719/320
(58) Field of Classification Search .......... 719/313, 719/320, 328
See application file for complete search history.

(56) References Cited

U.S. PATENT DOCUMENTS

| 6,516,356 B1* | 2/2003 | Belknap et al. ............. 719/328 |
| 6,732,365 B2* | 5/2004 | Belknap et al. ............. 719/328 |
| 6,865,733 B2* | 3/2005 | Broussard ................... 717/147 |
| 7,047,526 B1* | 5/2006 | Wheeler et al. ............. 717/143 |
| 7,370,335 B1* | 5/2008 | White et al. ................ 719/328 |
| 7,444,386 B2* | 10/2008 | Jensen et al. ................ 709/217 |
| 2003/0188043 A1* | 10/2003 | Woodall et al. ............. 709/328 |
| 2003/0221024 A1 | 11/2003 | Arroyo et al. |

* cited by examiner

Primary Examiner—Hyung S Sough
Assistant Examiner—Qing-Yuan Wu
(74) Attorney, Agent, or Firm—Hollingsworth & Funk (57) ABSTRACT

An apparatus and method for exchanging data between cellular modem software and application engine software of a communications device is disclosed that involves providing a communications module that facilitates communications between the cellular modem software and the application engine software. From the communications module, a generic function is invoked in response to a service request from the application engine software. The generic function is transformed to a specific function of the cellular modem software and the specific function of the cellular modem software is invoked.

29 Claims, 5 Drawing Sheets

APPARATUS AND METHOD FOR COMMUNICATING BETWEEN CELLULAR MODEM SOFTWARE AND APPLICATION ENGINE SOFTWARE OF A COMMUNICATIONS DEVICE

FIELD OF THE INVENTION

This invention relates in general to communications devices, and more particularly to an apparatus and method for communicating between cellular modem software and application engine software of a communications device.

BACKGROUND OF THE INVENTION

Personal communication devices such as cellular phones and personal digital assistants are often used for mobile computing and communications. Increasingly, these devices include digital connectivity that can provide many advanced communications services to users. These communications services may include voice, video, graphics, and many other forms of digital data that can be exchanged between users.

Previously, some mobile devices (e.g., cell phones) have had single purpose software/firmware that was targeted towards a single application, such as voice communications. More advanced phones, however, resemble computers as much as telephones. These phones include microprocessors and displays that can run general-purpose computer applications that may or may not have a relation to voice telephony. Such applications may be designed to run "standalone" (e.g. video games) or may use various communications channels of the cell phone for data communications (e.g., pictures, email).

As a result of advancing features in cellular phones, the software architecture of such phones has also become more complex. This complexity is dealt with by providing various layers of software between applications and hardware. For example, in some cellular data applications, the lowest-level software layer is known as cellular modem software. Cellular modem software provides mobile communication functionality based on the capabilities of the underlying hardware. Higher-level software is known as application engine software. The application engine software provides an environment in which user applications operates. For example, the Symbian® Operating System (OS) acts as application engine software in a wide variety of mobile devices. Symbian OS was designed specifically for the requirements of mobile devices. Layered architecture that separates the application engine software from the cellular modem software allows the user applications to be used and re-used on a wide variety of devices and over different communication hardware platforms and channels.

Symbian OS provides a telephony server known as Symbian Telephony Server (ETEL). ETEL allows application-level programs to be written that communicate with a diversity of hardware devices, and without the application programmers having to deal with detailed knowledge of the underlying hardware, protocols, or the cellular modem software. The generic interface provided by ETEL is important in a rapidly expanding field like telephony, where the devices that an application communicates with may not have existed when the application was written.

The ETEL server utilizes software extension modules called TSYs to communicate with the cellular modem software. TSYs are dynamically loadable server-side extension modules that allow telephony services (e.g. GSM, GPRS, 3G) and related data communication to be transparently integrated under Symbian OS. These services are implemented by device hardware and/or cellular networks that require real-time capabilities from cellular modem software. A TSY acts like proxy to translate service invocations on the ETEL server to specific cellular modem software commands, and vice versa. The module also implements protocol state machines and ensures reliable communications with the cellular modem software. The module might also perform flow control and data caching.

Although the use of TSYs is helpful in providing portable and easy ways to develop mobile application software to integrate Symbian OS, the use of TSYs still has disadvantages. The TSY is vendor specific and highly dependent on the underlying proprietary cellular modem software. Therefore a TSY must be written for every version of cellular modem software, as well as cellular modem software from different vendors. Also, a new TSY must also be written if there is a change to a protocol or standard handled by the TSY. For instance, a GSM TSY can not be reused on 3G hardware platform. TSYs are difficult and time-consuming to write and debug, therefore developing TSYs for an increasingly diverse base of hardware is non-trivial.

SUMMARY OF THE INVENTION

An apparatus and method for exchanging data between cellular modem software and application engine software of a communications device is disclosed. Both software is running concurrently on a communications device. In one embodiment, a method involves providing a communications module that facilitates communications between the cellular modem software and the application engine software. From the communications module, a generic function is invoked in response to a service request from the application engine software. The generic function is transformed to a specific function of the cellular modem software and the specific function of the cellular modem software is invoked.

In another embodiment of the present invention, a method involves providing a communications module that facilitates communications between the cellular modem software and the application engine software. From the cellular modem software, a specific function is invoked targeted for the communications module in response to a hardware event. The specific function is transformed to a generic function of the communications module and a method of the application engine software is invoked via the generic function of the communications module.

In another embodiment of the present invention, a computer-readable medium is configured with instructions for causing one or more processors of a data processing arrangement having concurrently running cellular modem software and application engine software to perform steps that include invoking a generic function of a communications module of the data processing arrangement in response to a service request from the application engine software. The generic function is transformed to a specific function of the cellular modem software, and the specific function of the cellular modem software is invoked.

In another embodiment of the present invention, a computer-readable medium is configured with instructions for causing one or more processors of a data processing arrangement having concurrently running cellular modem software and application engine software to perform steps that include invoking from the cellular modem software a specific function in response to a hardware event targeted for the application engine software. The specific function is transformed to a generic function of a communications module of the data processing arrangement, and a method of the application engine software is invoked via the generic function of the communications module.

In another embodiment of the present invention, a data terminal includes a memory storing a communications module. One or more processors are coupled to the memory and operable by cellular modem software and application engine software. The processors are operable to exchange data between the cellular modem software and the application engine software by processing communications between the communications module and the application engine software. The generic functions of the communications module are processed to communicate with the communications module. Specific functions of the cellular modem software are processed to communicate with the cellular modem software. Generic functions of the communications module are translated between specific functions of the cellular modem software to facilitate communications therebetween.

In another embodiment of the present invention, a data terminal includes: 1) means for operating cellular modem software and application engine software on the data terminal; 2) means for processing communications between the application engine software and a communications module of the data terminal; 3) means for processing generic functions of the communications module to communicate with the communications module; 4) means for processing specific functions of the cellular modem software to communicate with the cellular modem software; and 5) means for translating between generic functions of the communications module and specific functions of the cellular modem software to facilitate communications therebetween.

In more particular embodiments of the present invention, the communications module may include a telephony module, such as a Telephony Server Module (TSY) compatible with Symbian ETEL. The application engine software may include the Symbian operating system. In one arrangement, the generic functions of the communications module are based on a set of abstract primitives, and specific functions of the cellular modem software are on one or more concrete primitives associated with the cellular modem software. The concrete primitives are configured to inherit characteristics from the abstract primitives.

BRIEF DESCRIPTION OF THE DRAWINGS

The invention is described in connection with the embodiments illustrated in the following diagrams.

DETAILED DESCRIPTION OF THE INVENTION

In the following description, reference is made to the accompanying drawings which form a part hereof, and in which is shown by way of illustration various embodiments in which the invention may be practiced. It is to be understood that other embodiments may be utilized, as structural and operational changes may be made without departing from the scope of the present disclosure.

Generally, the present disclosure relates to communications between application engine software and cellular modem software of a communications device. One or more loadable communications modules facilitate communications between the application engine software and cellular modem software for providing cellular data service. In one example, the loadable communications modules include Telephony Server Modules (TSYs) for use with the Symbian® Telephony Server (ETEL).

The communication modules communicate with cellular modem software via a generic interface to affect the underlying hardware. The generic interface allows the communications modules to be re-used with various types of hardware. The generic interface communicates with the cellular modem software using commands that are specific to the cellular modem software. The generic interface communicates with the application engine software through a TSY using generic commands that abstract specific commands. The generic interface transforms these generic commands to commands specific to the particular device in use.

The application engine software and cellular modem software run concurrently on the same device. The application engine software provides an environment for running user applications on a mobile device. The cellular modem software provides cellular communications services via cellular modem devices. Each software component may associate with a different operating system running on the device. Typically these operating systems intercommunication for synchronization, and some system controlling functions are handled by specialized servers on both sides. The operating systems may share one central processing unit (CPU) or run on different CPUs. Similarly, the operating systems may share a single digital signal processor (DSP), or each operating system may have its own DSP.

Figure 1:
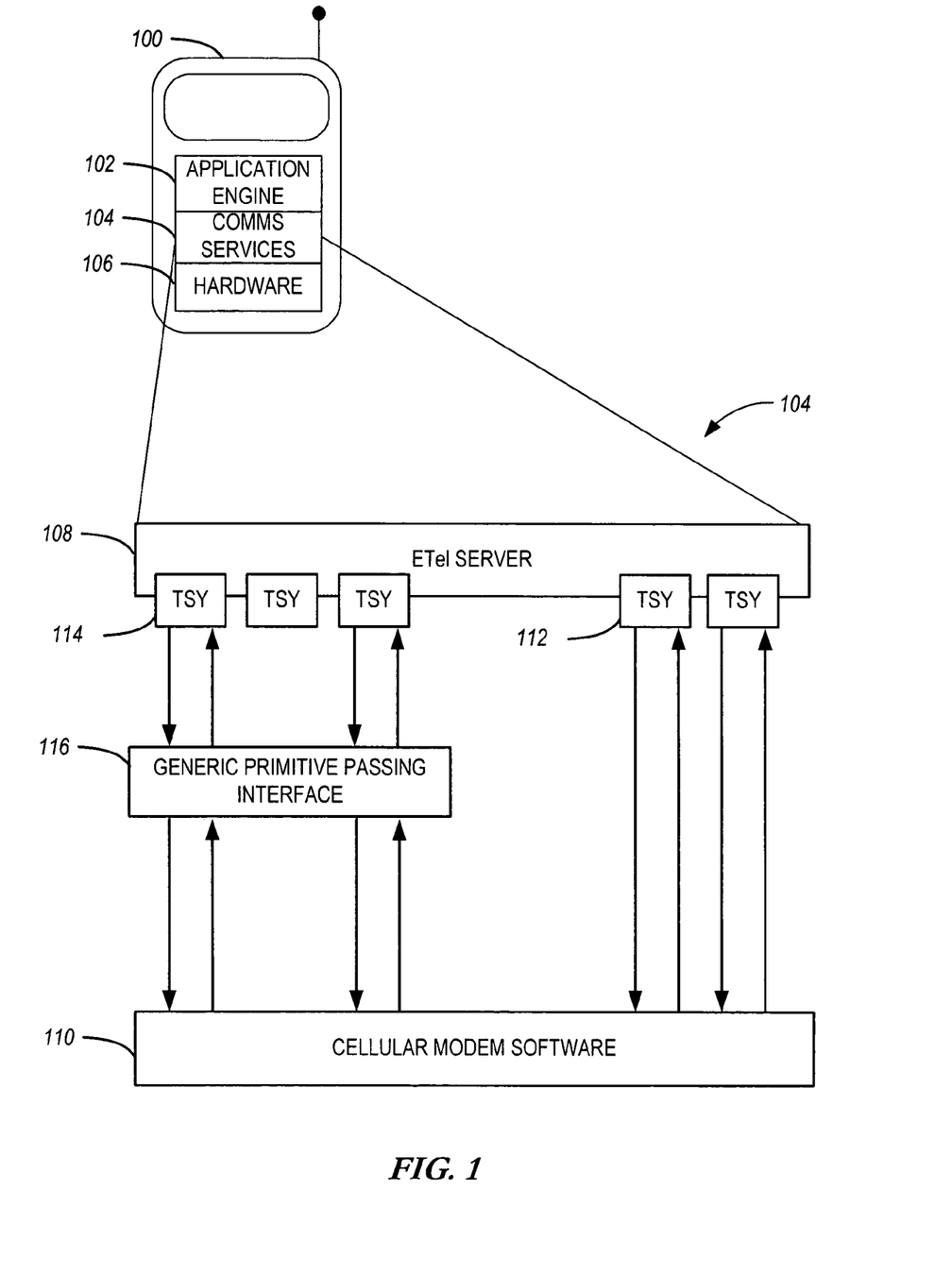
FIG. 1 illustrates a communications device and software architecture according to embodiments of the present invention.

FIG. 1 illustrates a communications device 100 according to embodiments of the present invention. The communications device 100 may be a mobile telephone, Personal Digital Assistant (PDA), or any other similar fixed or mobile device capable of running software capable of communicating via a wired or wireless network. The communications device 100 includes an application engine 102 for running user applications. The application engine 102 may communicate with hardware components 106 via a communications services layer 104. The communications service layer 104 provides a high-level abstraction of hardware and protocol functionality for easy implementation of this functionality in the application engine 102. The communications services layer 104 allows cellular modem functionality to be provided in support of communications services, even though the application engine 102 may not be directly controlling a cellular modem or similar device.

The communications layer 104 is shown in greater detail in the lower part of FIG. 1. The communications layer 104 is generally illustrated according to a Symbian ETEL server arrangement, although it will be appreciated that concepts of the invention described herein may be applicable to other arrangements of communications services in a communications device 100. The applications 102 access communications functionality via an ETEL server module 108. The ETEL server module 108 provides telephony and related data communications services to the application engine 102. The data communications services often rely on lower-level, real-time functionality to properly process communications protocols. This lower-level functionality of the communication is controlled via cellular modem software 110.

As previously described, the ETEL server module 108 typically communicates with the cellular modem software 110 via TSYs 112. The TSYs 112 are designed to provide particular signaling and data communication functionalities. In the illustrated arrangement, the TSY 112 is written specifically for the cellular modem software 110. However, in an embodiment according to the present invention, the ETEL module 108 may also utilize a generic TSY 114 that communicates via a Generic Primitive Passing Interface (GPPI) 116. By communicating with the cellular modem software 110 via the GPPI 116, the TSY 114 is freed from being specific to a particular cellular modem software implementation.

The GPPI 116 is a generic framework that abstracts services of the cellular modem software 110 for access by the generic TSY 114. The generic TSY 114 may be used with any type of hardware and/or cellular modem software that includes the appropriate GPPI 116. This allows the TSY 114 to be easily ported and/or reused with various hardware and software architectures.

In one embodiment, the GPPI 116 operates by abstracting the interactions between the generic TSY 114 and cellular modem software 110 into predetermined categories, or primitives. Each operation, therefore, between the generic TSY 114 and cellular modem software 110 may be formed by a combination of one or more of these primitives. The GPPI 106 acts as an intermediary that translates the generic primitives used by the TSY 114 into concrete primitives used to form commands of the cellular modem software 110.

Figure 2:
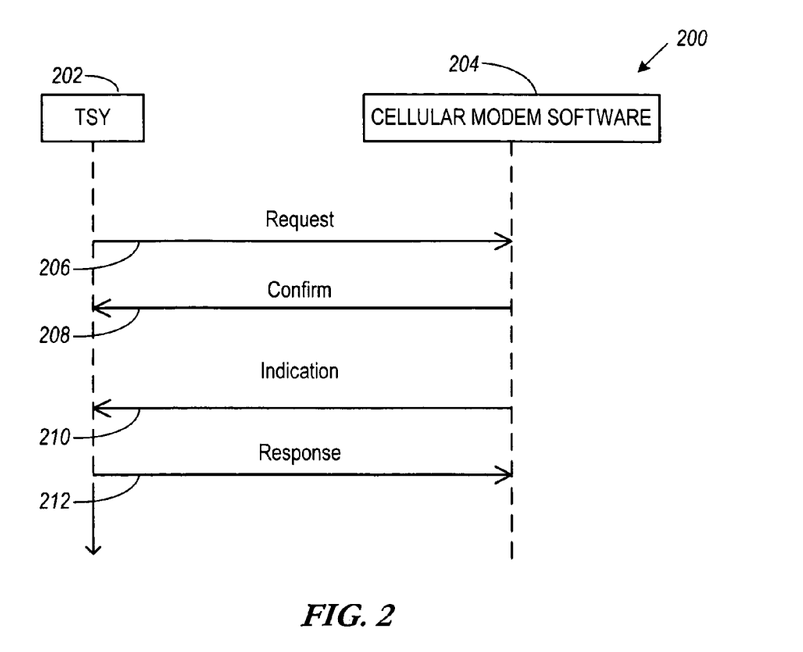
FIG. 2 illustrates generic primitives according to embodiments of the present invention.

In reference now to FIG. 2, a diagram 200 illustrates the use of primitives between a TSY 202 and cellular modem software 204 according to various embodiments of the present invention. In the illustrated example, the operations between the TSY 202 and the cellular modem software 204 are broken down into four primitives: request 206, confirm 208, indication 210, response 212. The request primitive 206 is sent by the TSY 202 to request a cellular modem software service. The cellular modem software 204 responds using the confirm primitive 208. The cellular modem software 204 may need to asynchronously notify the TSY 202 when certain events occur (e.g., call received, battery low, etc.). This is handled by the indication primitive 210, which is sent from the cellular modem software 204 to the TSY 202. The response primitive 212 is sent from the TSY 202 in response to the indication 210.

The four classes of primitives can remain the same even though the service type and data structures can vary depending on the underlying cellular modem software. Therefore, it will be appreciated that the primitive classes can describe abstract primitives. Concrete primitives can inherit characteristics from each of the primitive classes, as well as describing the underlying service types and data structure of a specific cellular modem software implementation. Therefore, the concept of inheritance may be used by a GPPI to translate between abstract and concrete primitives. For example, the invocation of a call service requires two primitives: "call request" and "call confirm." The GPPI defines two abstract primitives CALL_REQ and CALL_CONF. The concrete implementation of GPPI adapts abstracts these primitives to protocols used by cellular modem software used in the cellular device.

Figure 3:
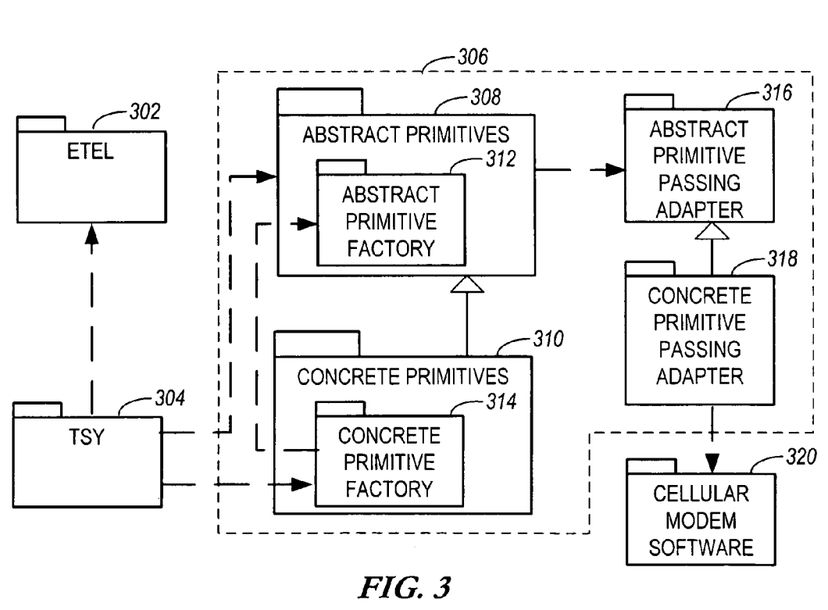
FIG. 3 is a component diagram showing factory patterns for producing primitives according to embodiments of the present invention.

An example of a GPPI structure is illustrated in FIG. 3 according to various embodiments of the present invention. An ETEL server 302 communicates with a generic TSY 304 in the usual manner. The generic TSY 304 interfaces with components of the GPPI 306, which include abstract primitives 308 and concrete primitives 310. The abstract primitives 308 are those that are implementation independent, while the concrete primitives are those used by the vendor specific implementation of cellular modem software 320. The abstract primitives 308 are created by an interface known as an abstract primitive factory 312.

Generally, the abstract primitive factory 312 is based on the abstract factory design pattern described in "Design Patterns" by Gamma, et al. The abstract primitive factory 312 provides an interface for creating families of related or dependent objects (e.g., "call request", "call confirm") without specifying implementation specific, or concrete, information. This allows the users of the abstract primitive factory 312 (in this case the TSY 304) to perform cellular modem software-type operations using primitives without requiring any knowledge of the underlying cellular modem software 320.

The abstract primitive factory 312 is an interface used to create the concrete primitives 310. It is up to the concrete factory 314 to actually create the concrete primitives 310. The concrete primitive factory 314 contains the logic that determines how the abstract primitives 308 are translated into concrete primitives 310. There may be various mappings (e.g., one-to-one, one-to-many) of abstract primitives 308 to concrete primitives 310, as well as different data structures used by the primitives.

The concrete and abstract primitive factories 312, 314 are generally concerned with transformation of abstract to concrete primitives, although the factories may require some knowledge of communications sequences and operations of the underlying cellular modem software 320. However, the actual sequencing and passing of data is handled by the abstract primitive passing adapter 316 and the concrete primitive passing adapter 318. The passing adapters 316, 318 handle the actual message exchanges between the TSY 304 and the cellular modem software 320 using the primitives. The abstract primitive passing adapter 316 is a generic interface that is used to send primitives from the generic TSY 304. The concrete primitive passing adapter 318 inherits from the generic adapter 316 and contains the cellular modem software specific communications functionality of the specific system.

Figure 4:
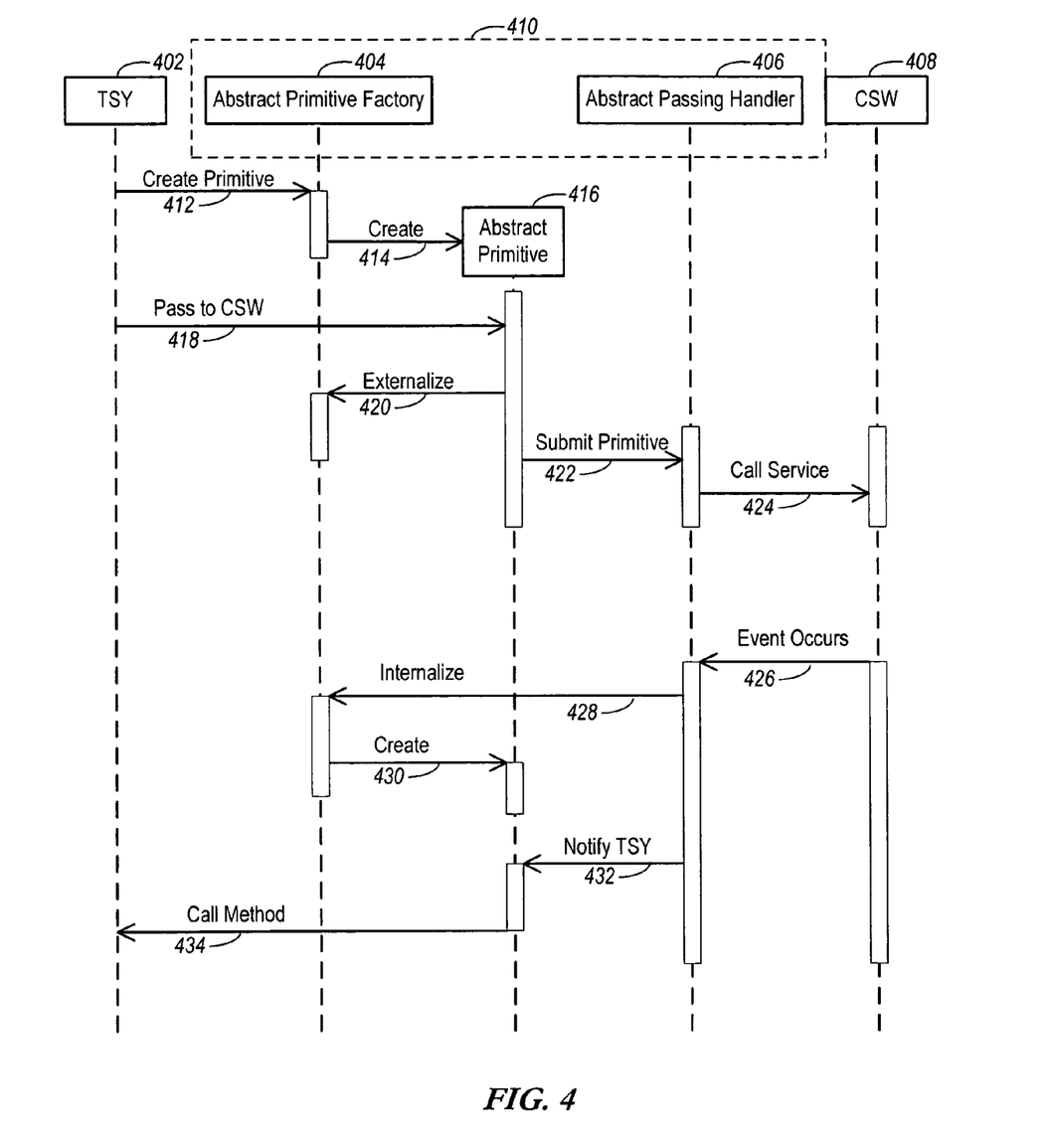
FIG. 4 is a sequence diagram showing the operating of factory objects according to embodiments of the present invention.

In reference now to FIG. 4, the interactions between a GPPI using factory classes are illustrated according to embodiments of the present invention. A generic TSY 402 and cellular modem software (CSW) 408 communicate via a GPPI 410 that includes an abstract primitive factory 404 and an abstract passing handler 406. When the TSY 402 initiates a service request directed for the cellular modem software 408, the TSY 402 first requests 412 that the abstract primitive factory 404 creates the appropriate primitive. The abstract primitive factory 404 then creates 414 the appropriate abstract primitive 416 for the task. The TSY 402 then uses the abstract primitive 416 to pass 418 the service request to the cellular modem software 408. At this point, the abstract primitive 416 externalizes 420 a concrete primitive for use by the cellular modem software 408.

Generally, externalization refers to the process of recording the object state in a stream of data. In other words a chunk of data is created in the format defined by the interface of cellular modem software. So, in this example, the abstract primitive 416 may assume the characteristics of one or more concrete primitives particular to the cellular modem software 408. The externalization 420 may occur at a concrete primitive factory (not shown) that inherits from the abstract primitive factory 404. Similarly, internalization refers to the process of instantiating an object from a chunk of data received from the cellular modem software 408. Internalization is performed as well as externalization by a concrete primitive factory (e.g., concrete primitive factory 314 in FIG. 3) that is hidden by the abstract primitive factory interface 404. The concrete primitive factory creates a new instance of a concrete primitive that is used by GPPI and/or TSY through their abstract primitive interface(s).

The data chunk created by externalization 420 is then submitted 422 to the abstract passing handler 406. It will be appreciated that a concrete instance (not shown) of the abstract handler 406 does the actual communications with the cellular modem software 408. In this case, the communications with the cellular modem software 408 involves calling 424 the service using the concrete primitives.

The cellular modem software 408 may need to asynchronously communicate with the TSY 402 in order to send data regarding hardware, external communication, or similar events. Such an event 426 is communicated to the abstract passing handler 406 using an internal CSW data chunk. The abstract passing handler 406 internalizes this chunk to create 430 an instance of the concrete primitive 416. The abstract passing handler 406 then casts the concrete primitive into the abstract primitive 416 to notify 432 the TSY 402, and the abstract primitive 416 calls 434 the appropriate method of the TSY 434 associated with the primitive 416.

Figure 5:
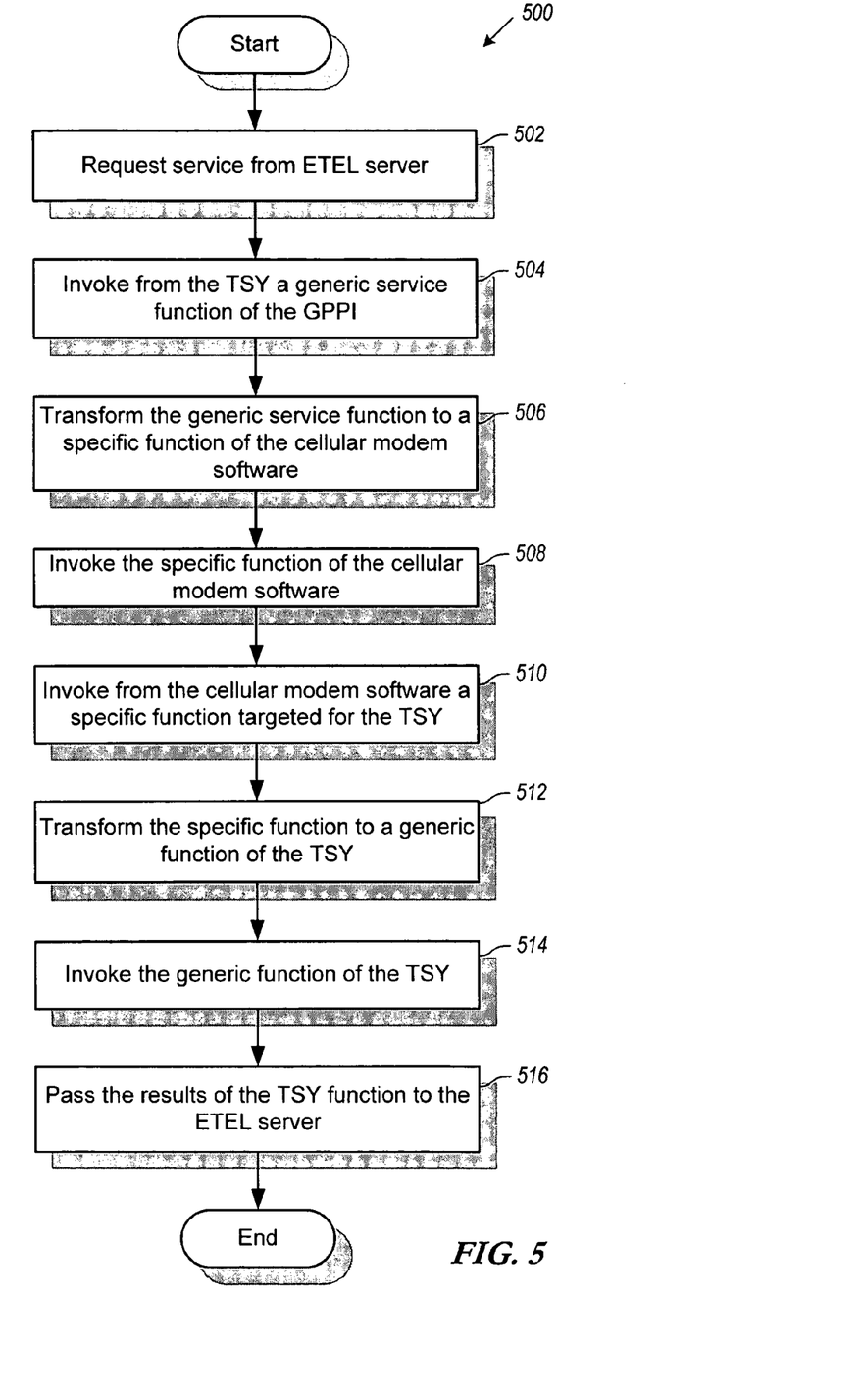
FIG. 5 is a flowchart showing the use of primitives according to embodiments of the present invention.

Referring now to FIG. 5, a procedure 500 is illustrated that may be used to facilitate communications between cellular modem software and application engine software in accordance with embodiments of the present invention. The procedure 500 begins when a service is requested (502) via a functional entity such as an ETEL server. Based on this request, a generic service of a GPPI is invoked (504) from a generic TSY. The generic service call may be broken down into one or more primitives by the GPPI. The GPPI transforms (506) the generic request to a specific function of the cellular modem software. This transformation (506) of the generic request may be accomplished using a factory to externalize primitives. The cellular modem software-specific function is then invoked (508).

Invoking the cellular modem software-specific function may result in a response function being invoked (510) that is targeted for the TSY. It will be appreciated that, in other scenarios, the cellular modem software-specific function may be invoked (508) in response to an asynchronously occurring hardware or software event, and not necessarily due to any actions initiated by the TSY. The specific function of the cellular modem software is transformed (512) into a generic function of the TSY. This transformation (512) may be performed at the GPPI by internalizing the cellular modem software-specific function into concrete primitives, and then casting the concrete primitives into abstract primitives to form a generic function of the TSY. The generic function can be invoked (514) at the TSY, and the results passed (516) to the ETEL server.

The communication capabilities as described herein are useful for any manner of communications device. In particular, mobile device can benefit from using a generic interface for modules that communicate between cellular modem software and application engine software. By utilizing a generic interface for these modules, reliability of the modules can increase due to re-usability of tested modules. Similarly, costs of developing modules for new hardware are decreased significantly.

Mobile devices are typically wireless device, such as wireless/cellular telephones, personal digital assistants (PDAs), or other wireless handsets, as well as portable computing devices capable of wireless communication. Many of these devices are capable of wired/landline communications as well. These landline and mobile devices utilize computing circuitry and software to control and manage the conventional device activity as well as the communications functionality as described herein. Hardware, firmware, software or a combination thereof may be used to perform the various module communications functions described herein.

Figure 6:
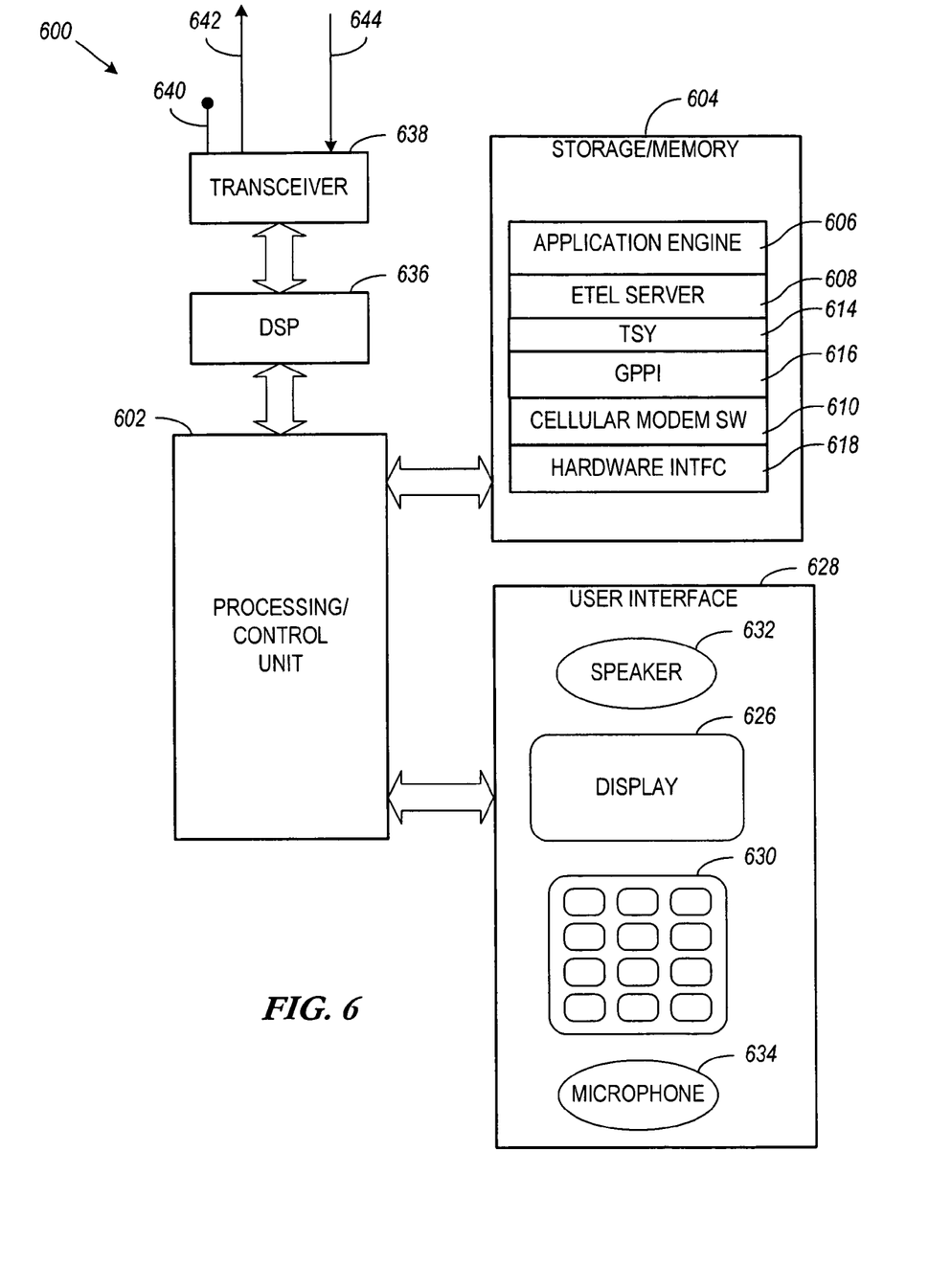
FIG. 6 shows a data terminal according to embodiments of the present invention.

An example of a representative mobile terminal computing system capable of carrying out operations in accordance with the invention is illustrated in FIG. 6. Those skilled in the art will appreciate that the exemplary mobile computing environment 600 is merely representative of general functions that may be associated with such mobile devices, and also that landline computing systems similarly include computing circuitry to perform such operations.

The mobile computing arrangement 600 is suitable for processing data sessions in accordance with embodiments of the present invention. The representative mobile computing arrangement 600 includes a processing/control unit 602, such as a microprocessor, reduced instruction set computer (RISC), or other central processing module. The processing unit 602 need not be a single device, and may include one or more processors. For example, the processing unit may include a master processor and associated slave processors coupled to communicate with the master processor.

The processing unit 602 controls the basic functions of the mobile terminal. Those functions associated with cellular modem communications via generic communications modules may be included as instructions stored in a program storage/memory 604. In one arrangement, an application engine 606 is included in the program storage/memory 604. The application engine 606 communicates with a communications server 608 (e.g., ETEL server) for telephony and related external communications.

The communications server 608 may communicate with a hardware specific cellular modem software 610 via a generic TSY 614. The generic TSY 614 interfaces with the cellular modem software 610 via a GPPI 616 that is used for translating generic cellular modem software requests to specific cellular modem software service requests. The cellular modem software 610 communicates with a cellular interface 618 to carry out communications of the arrangement 600.

The program storage/memory 604 may also include operating systems for carrying out functions and applications associated with both the cellular modem software and the application engine software on the mobile terminal. The program storage 604 may include one or more of read-only memory (ROM), flash ROM, programmable and/or erasable ROM, random access memory (RAM), subscriber interface module (SIM), wireless interface module (WIM), smart card, or other removable memory device, etc.

In one embodiment of the invention, the program modules associated with the storage/memory 604 are stored in non-volatile electrically-erasable, programmable ROM (EEPROM), flash ROM, etc. so that the information is not lost upon power down of the mobile terminal. The relevant software for carrying out conventional mobile terminal operations and operations in accordance with the present invention may also be transmitted to the mobile computing arrangement 600 via data signals, such as being downloaded electronically via one or more networks, such as the Internet and an intermediate wireless network(s).

The processor 602 is also coupled to user-interface 626 elements associated with the mobile terminal. The user-interface 626 of the mobile terminal may include, for example, a display 628 such as a liquid crystal display, a keypad 630, speaker 632, and microphone 634. These and other user-interface components are coupled to the processor 602 as is known in the art. Other user-interface mechanisms may be employed, such as voice commands, switches, touch pad/screen, graphical user interface using a pointing device, trackball, joystick, or any other user interface mechanism.

The mobile computing arrangement 600 also includes conventional circuitry coupled to the hardware interface 618 for performing wireless transmissions. A digital signal processor (DSP) 636 may be employed to perform a variety of functions, including analog-to-digital (A/D) conversion, digital-to-analog (D/A) conversion, speech coding/decoding, encryption/decryption, error detection and correction, bit stream translation, filtering, etc. The transceiver 638, generally coupled to an antenna 640, transmits the outgoing radio signals 642 and receives the incoming radio signals 644 associated with the wireless device.

The mobile computing arrangement 600 of FIG. 6 is provided as a representative example of a computing environment in which the principles of the present invention may be applied. From the description provided herein, those skilled in the art will appreciate that the present invention is equally applicable in a variety of other currently known and future mobile and landline computing environments. For example, desktop computing devices similarly include a processor, memory, a user interface, and data communication circuitry. Thus, the present invention is applicable in any known computing structure where data may be communicated via a network.

Using the description provided herein, the invention may be implemented as a machine, process, or article of manufacture by using standard programming and/or engineering techniques to produce programming software, firmware, hardware or any combination thereof. Any resulting program(s), having computer-readable program code, may be embodied on one or more computer-usable media, such as disks, optical disks, removable memory devices, semiconductor memories such as RAM, ROM, PROMS, etc.

Articles of manufacture encompassing code to carry out functions associated with the present invention are intended to encompass a computer program that exists permanently or temporarily on any computer-usable medium or in any transmitting medium which transmits such a program. Transmitting mediums include, but are not limited to, transmissions via wireless/radio wave communication networks, the Internet, intranets, telephone/modem-based network communication, hard-wired/cabled communication network, satellite communication, and other stationary or mobile network systems/communication links. From the description provided herein, those skilled in the art are readily able to combine software created as described with appropriate general purpose or special purpose computer hardware to create a messaging system and method in accordance with the present invention.

The foregoing description of the exemplary embodiment of the invention has been presented for the purposes of illustration and description. It is not intended to be exhaustive or to limit the invention to the precise form disclosed. Many modifications and variations are possible in light of the above teaching. Thus, it is intended that the scope of the invention be limited not with this detailed description, but rather determined from the claims appended hereto.

What is claimed is:

1. A processor-based method comprising:
    operating a communications module that facilitates operating system-level synchronization between cellular modem software and application engine software that are both running concurrently on an apparatus;
    invoking from the communications module a generic function in response to a service request from the application engine software, wherein the generic function comprises at least one of a request function and a response function directed to the cellular modem software;
    transforming the generic function to a specific function of the cellular modem software; and
    invoking the specific function of the cellular modem software.

2. The method of claim 1, further comprising:
    sending a specific reply of the cellular modem software targeted for the communications module in response to the specific function, wherein the specific reply comprises at least one of a confirm function and an indication function targeted to the application engine software;
    transforming the specific reply to a generic reply; and
    sending the generic reply from the communications module to invoke a method of the application engine software.

3. The method of claim 1, wherein the communications module comprises a telephony module.

4. The method of claim 1, wherein the application engine software includes the Symbian operating system.

5. The method of claim 4, wherein the communications module comprises a Telephony Server Module (TSY) compatible with a Symbian Telephony Server (ETEL).

6. The method of claim 1, wherein invoking from the communications module the generic function comprises forming one or more abstract primitives based on the generic function.

7. The method of claim 6, wherein transforming the generic function to the specific function of the cellular modem software comprises forming one or more concrete primitives that inherit characteristics from the one or more abstract primitives to form the specific function.

8. A processor-based method comprising:
    operating a communications module that facilitates operating system-level synchronization between cellular modem software and application engine software that are both running concurrently on an apparatus;
    invoking from the cellular modem software a specific function targeted for the application engine software in response to a hardware event, wherein the specific function comprises at least one of a confirm function and an indication function;
    transforming the specific function to a generic function of the communications module; and
    invoking a method of the application engine software via the generic function of the communications module.

9. The method of claim 8, further comprising:
    sending in response to the method of the application engine software a generic reply of the communications module targeted for the cellular modem software;
    transforming the generic reply to a specific reply of the cellular modem software; and
    sending the specific reply to the cellular modem software.

10. The method of claim 8, wherein the communications module comprises a telephony module.

11. The method of claim 8, wherein the application engine software includes the Symbian operating system.

12. The method of claim 11, wherein the communications module comprises a Telephony Server Module (TSY) compatible with a Symbian Telephony Server (ETEL).

13. The method of claim 8, wherein invoking from the cellular modem software the specific function comprises forming the specific function from one or more concrete primitives associated with the cellular modem software.

14. The method of claim 13, wherein the concrete primitives inherit characteristics from one or more abstract primitives, and wherein transforming the specific function to the generic function of the communications module comprises forming the generic function from the one or more abstract primitives.

15. A computer-usable medium configured with stored instructions for causing one or more processors of a data processing arrangement to facilitate operating system-level synchronization between concurrently running cellular modem software and application engine software by performing:
  invoking a generic function of a communications module of the data processing arrangement in response to a service request from the application engine software, wherein the generic function comprises at least one of a request function and a response function directed to the cellular modem software;
  transforming the generic function to a specific function of the cellular modem software; and
  invoking the specific function of the cellular modem software.

16. The computer-usable medium of claim 15, wherein the communications module comprises a telephony module.

17. The computer-usable medium of claim 15, wherein the communications module comprises a Telephony Server Module (TSY) compatible with a Symbian Telephony Server (ETEL).

18. The computer-usable medium of claim 15, wherein invoking from the communications module the generic function comprises forming one or more abstract primitives based on the generic function.

19. The computer-usable medium of claim 18, wherein transforming the generic function to the specific function of the cellular modem software comprises forming one or more concrete primitives that inherit characteristics from the one or more abstract primitives to form the specific function.

20. A computer-usable medium configured with stored instructions for causing a processor of a data processing arrangement to facilitate operating system-level synchronization between cellular modem software and application engine software to by performing:
  invoking from the cellular modem software a specific function in response to a hardware event targeted for the application engine software, wherein the specific function comprises at least one of a confirm and an indication function;
  transforming the specific function to a generic function of a communications module of the data processing arrangement; and
  invoking a method of the application engine software via the generic function of the communications module.

21. The computer-usable medium of claim 20, wherein the communications module comprises a telephony module.

22. The computer-usable medium of claim 20, wherein the communications module comprises a Telephony Server Module (TSY) compatible with a Symbian Telephony Server (ETEL).

23. The computer-usable medium of claim 20, wherein invoking from the cellular modem software the specific function comprises forming the specific function from one or more concrete primitives associated with the cellular modem software.

24. The computer-usable medium of claim 23, wherein the concrete primitives inherit characteristics from one or more abstract primitives, and wherein transforming the specific function to the generic function of the communications module comprises forming the generic function from the one or more abstract primitives.

25. An apparatus comprising:
  a memory storing a communications module; and
  one or more processors coupled to the memory and operable by cellular modem software and application engine software, the processors operable by the communications module to process operating system-level synchronization communications between the cellular modem software and the application engine software by performing:
    processing generic functions of the communications module to communicate with the application engine software, wherein the generic functions comprise at least one of request and response functions directed to the cellular modem software, and confirm and indication functions directed to the application engine software;
    processing specific functions of the cellular modem software to communicate with the cellular modem software; and
    translating between generic functions of the communications module and specific functions of the cellular modem software to facilitate communications therebetween.

26. The apparatus of claim 25, wherein the communications module comprises a telephony module.

27. The apparatus of claim 25, wherein the communications module comprises a Telephony Server Module (TSY) compatible with a Symbian Telephony Server (ETEL).

28. The apparatus of claim 25, wherein translating between generic functions of the communications module and specific functions of the cellular modem software comprises basing the generic functions on one or more abstract primitives and basing the specific functions on one or more concrete primitives associated with the cellular modem software, the concrete primitives inheriting characteristics from the abstract primitives.

29. An apparatus comprising:
  means for operating cellular modem software and application engine software on the apparatus;
  means for processing operating system-level synchronization communications between the application engine software and the cellular modem software via a communications module of the apparatus;
  means for processing generic functions of the communications module to communicate with the application engine software, wherein the generic functions comprise at least one of: request and response functions directed to the cellular modem software, and confirm and indication functions directed to the application engine software;
  means for processing specific functions of the cellular modem software to communicate with the cellular modem software; and
  means for translating between generic functions of the communications module and specific functions of the cellular modem software to facilitate communications therebetween.

* * * * *